(12) United States Patent
Kalitzin et al.

(10) Patent No.: US 7,668,705 B2
(45) Date of Patent: Feb. 23, 2010

(54) METHOD FOR COMPUTING TURBULENT FLOW USING A NEAR-WALL EDDY-VISCOSITY FORMULATION

(76) Inventors: Georgi Kalitzin, 637 Alvarado Row, Stanford, CA (US) 94305; Gorazd Medic, 3330 Broderick St., Apt. 2, San Francisco, CA (US) 94123; Jeremy Alan Templeton, 225 Clifton St. #122, Oakland, CA (US) 94618

( * ) Notice: Subject to any disclaimer, the term of this patent is extended or adjusted under 35 U.S.C. 154(b) by 363 days.

(21) Appl. No.: 11/484,985

(22) Filed: Jul. 11, 2006

(65) Prior Publication Data
US 2008/0015825 A1     Jan. 17, 2008

(51) Int. Cl.
G06F 17/00 (2006.01)
G06F 17/10 (2006.01)
G06F 17/12 (2006.01)
G06G 7/57 (2006.01)

(52) U.S. Cl. .................. 703/2; 703/7; 703/9
(58) Field of Classification Search ........... 703/2, 703/9, 7, 8, 6
See application file for complete search history.

(56) References Cited

U.S. PATENT DOCUMENTS

2003/0040894 A1* 2/2003 Miyori et al. ............... 703/6
2005/0107995 A1* 5/2005 Inagaki ....................... 703/2

OTHER PUBLICATIONS

Hans J. Kaltenbach, "Towards a near-wall model for LES of a separated diffuser flow" by H. J. Kaltenbach, 1998, Center for Turbulence Research Annual Research Briefs, pp. 255-265.*

"Large eddy simulation wall-modelling based on suboptimal control theory and linear stochastic estimation" by F. Nicoud et al, Oct. 2001, Physics of Fluids, vol. 13 No. 10, pp. 2968-1984.*

"Large-eddy simulation: achievements and challenges" bu U. Piomell, 1999, Pergamon, Progress in Aerospace Sciences 35, pp. 335-362.*

"Resolution requirements in large-eddy simulations of shear flows" by J. S. Baggett et al, 1997, Center for Turbulence Research Annual Research Briefs, pp. 51-66.*

"Near-wall behavior of RANS turbulence models and implications for wall functions" by G. Kalitzin et al, Nov. 23, 2004, Elsevier, Journal of Computational Physics 204, pp. 265-291.*

"Integration of RANS and LES Flow Solvers for Simultaneous Flow Computations" by J. U. Schluter et al, Jan. 9, 2003, American Institute of Aeronautics and Astronautics, AIAA 2003-0085, pp. 1-8.*

(Continued)

*Primary Examiner*—Kamini S Shah
*Assistant Examiner*—Hung Havan

(57) ABSTRACT

A technique that improves large-eddy simulation consists in replacing the instantaneous sub-grid scale eddy-viscosity (such as the dynamic Smagorinsky model eddy-viscosity) in the near-wall region with an eddy-viscosity computed from Reynolds Averaged Navier-Stokes eddy-viscosity and corrected dynamically using the resolved turbulent stress. The near-wall eddy-viscosity formulation is applied either with a wall stress model on coarse grids that do not resolve the wall or with wall-resolved grids coarsened in the wall-parallel directions. Reynolds averaged Navier-Stokes eddy-viscosity is computed either from a look-up table or from a simultaneous solution of a Reynolds Averaged Navier-Stokes turbulence model.

13 Claims, 4 Drawing Sheets

OTHER PUBLICATIONS

H. Kaltenbach, "Towards a near-wall model for LES of a separated diffuser flow", 1998, Center for Turbulence Research Annual Research Briefs, pp. 255-265.*

F. Nicoud, J. S. Baggett, P. Moin, W. Cabot, "Large eddy simulation wall-modelling based on suboptimal control theory and linear stochastic estimation", Oct. 2001, Physics of Fluids, vol. 13 No. 10, pp. 2968-1984.*

U. Piomelli, "Large-eddy simulation: achievements and challenges", 1999, Pergamon, Progress in Aerospace Sciences 35, pp. 335-362.*

J. S. Baggett, J. Jimenez, A. G. Kravchenko, "Resolution requirements in large-eddy simulations of shear flows", 1997, Center for Turbulence Research Annual Research Briefs, pp. 51-66.*

G. Kalitzin, G. Medic, G. Iaccarino, P. Durbin, "Near-wall behavior of RANS turbulence models and implications for wall functions", Nov. 2004, Elsevier, Journal of Computational Physics 204, pp. 265-291.*

J. U. Schluter, "Integration of RANS and LES Flow Solvers for Simultaneous Flow Computations", Jan. 2003, American Institute of Aeronautics and Astronautics, AIAA 2003-0085, pp. 1-8.*

M. Strelets, Detached eddy simulation of massively separated flows, AIAA paper, 2001-0879.

N.V. Nikitin F. Nicoud, B. Wasistho, K.D. Squires and P.R. Spalart, An approach to wall modeling in large eddy simulations, Physics of fluids, pp. 1629-1632, vol. 12, No. 7, 2000.

U. Piomelli & E. Balaras, Wall layer models for LES, Annu. Rev. Fluid Mech, pp. 349-374, vol. 34, 2002.

W. Cabot, Wall models in large eddy simulations of separated flow. CTR, Annu. Res. Briefs, pp. 97-106, 1997.

M. Wang & P. Moin, Dynamic wall modeling for LES of complex flows, Physics of fluids, pp. 2043-2051, vol. 14, No. 7, 2002.

G. Kalitzin, J.A. Templeton & G. Medic, A near-wall eddy viscosity formulation for LES, lecture notes in computational science and engineering, vol. 56, Springer, 2006.

* cited by examiner

METHOD FOR COMPUTING TURBULENT FLOW USING A NEAR-WALL EDDY-VISCOSITY FORMULATION

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to computation of turbulent flow for engineering applications.

2. Prior Art

The invented near-wall eddy-viscosity formulation has been developed as an ingredient of large-eddy simulation (LES) aimed at reducing its cost for prediction of turbulent flow at high Reynolds numbers. The Reynolds number is a non-dimensional parameter characterizing the flow of a viscous fluid and is defined as Re=uL/v, where u and L are the characteristic velocity and length-scale, respectively, and v is the kinematic viscosity of the fluid.

LES resolves the large-scale structures of the flow while modeling the small-scale phenomena. This allows many of the important flow features to be captured without the expense of resolving the smaller scales, whose effects on the large scales are accounted for by sub-grid scale (SGS) models, such as the dynamic Smagorinsky model. However, LES has not yet been applied successfully to wall-bounded flows at high Reynolds numbers, because current SGS models do not properly account for the small, dynamically important features near a wall. As a consequence, these features must be resolved, resulting in the grid resolution scaling almost as expensive as the direct numerical simulation (DNS), limiting LES to low to moderate Reynolds numbers. A comprehensive description of LES framework and SGS models is given by Sagaut, P. in "Large Eddy Simulation for Incompressible Flows", Springer Verlag, Second Edition, 2002.

In an effort to allow LES to be efficiently applied to high Reynolds number flows, many techniques have been proposed. One such technique involves the use of grids coarsened in the wall-parallel direction, while leaving the wall-normal resolution unchanged; this reduces the computational cost for at least one order of magnitude. Not all turbulent scales can be resolved with such grids and additional modeling is required. Reynolds Averaged Navier-Stokes (RANS) equations are well suited for this type of grids because only the mean wall-normal gradients must be resolved while the entire turbulence spectrum is modeled. A comprehensive description of RANS framework and RANS turbulence models is given by Wilcox, D. C. in "Turbulence Modeling for CFD", DCW Industries, Second Edition, 1998. A well known approach in this category is detached-eddy simulation (DES) which was designed to simulate massively separated aerodynamic flows, where RANS is used in the boundary layer and LES resolves the separated region, see Strelets, M. (2001), "Detached Eddy Simulation of Massively Separated Flows", AIAA Paper 2001-0879. However, the coupling of RANS and LES regions is not formulated in a satisfactory manner; in the pressure-driven channel this causes a significantly over-predicted mass flow rate, see Nikitin, N. V., Nicoud, F., Wasistho, B., Squires, K. D., and Spalart, P. R. (2000), "An approach to wall modeling in large-eddy simulations," Phys. Fluids, Vol. 12 (7), pp. 1629. Another disadvantage of DES is its strong grid-dependence, where, surprisingly, the results usually worsen with refining the computational grid. In addition, DES on the wall-resolved grids does not recover the wall-resolved LES.

Another approach to reducing the computational cost of LES is wall modeling. A review of different wall models is presented in Piomelli, U., and Balaras, E. (2002), "Wall-layer models for large-eddy simulations", Ann. Rev. Fluid Mech., Vol. 34, pp. 349-374. These models are designed to be used with coarse grids that do not resolve the wall-layer, allowing LES at a fraction of the cost when compared to wall-resolved grids. Traditional wall models provide wall stresses to the LES as boundary conditions; a successful application of that approach is not trivial—the models are complicated and their application to general codes is not straightforward, as discussed in Cabot, W. (1997), "Wall models in large eddy simulation of separated flow", CTR Annual Research Briefs, pp. 97-106, and Wang, M., and Moin, P. (2002), "Dynamic wall modeling for large-eddy simulation of complex turbulent flows", Phys. Fluids, Vol. 14(7), pp. 2043-2051. In addition, these wall models are usually dependent on the numerical method and the Reynolds number.

Objects and Advantages

Accordingly, several objects and advantages of the present invention are:
(a) to provide a model that automatically adapts to the computational grid resolution;
(b) to provide a model that converges to wall-resolved LES when the grid is refined;
(c) to provide a model that is simple and easy to implement in a variety of computational codes;
(d) to provide a model that adds negligible extra computational cost to LES;
(e) to provide a model that is not dependent on the numerical methods used for LES; and
(f) to provide a model that enables LES of turbulent flow at high Reynolds numbers.

Further objects and advantages will become apparent from a consideration of the following description and drawings.

SUMMARY

The purpose of the near-wall eddy-viscosity formulation is to reduce the computational cost of predicting high Reynolds number turbulent flows of engineering importance, such as flows around wings, blades and bluff bodies (e.g. cars), by improving the accuracy of the large-eddy simulation on coarse near-wall grids.

DRAWINGS—FIGURES

DRAWINGS—REFERENCE NUMERALS

| 10 | outer LES region | 12 | near-wall region |
| 14 | airfoil | 16 | LES region |
| 18 | RANS region | | |

DETAILED DESCRIPTION—PREFERRED EMBODIMENT—FIG. 1

Figure 1:
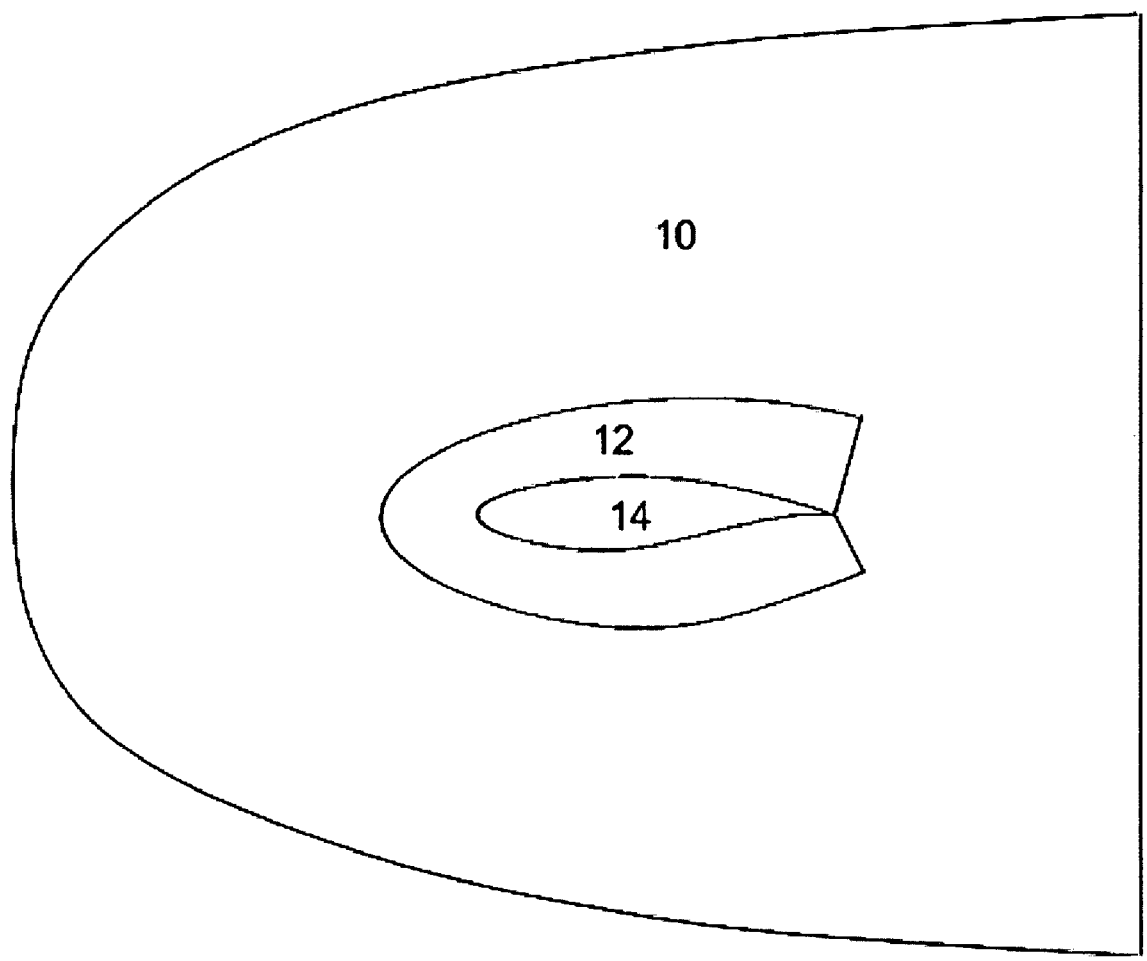
FIG. 1 shows the conceptual application of the near-wall eddy-viscosity formulation to large-eddy simulation of turbulent flow around an airfoil.

The invented near-wall eddy-viscosity formulation has been developed as an ingredient of LES aimed at reducing its cost for turbulent flows around wings, blades and bluff bodies. FIG. 1 shows the conceptual application of the near-wall eddy-viscosity formulation to large-eddy simulation flow around an airfoil. The computational mesh (domain) around an airfoil 14 is split in two distinct regions: the outer LES region 10 and the near-wall region 12.

The invented formulation consists in replacing the instantaneous SGS eddy-viscosity, $v_t^{SGS}$, in the near-wall region of an LES with the invented near-wall eddy-viscosity, $v_t^{SGS,NW}$, defined with the following relation:

$$v_t^{SGS,NW} = v_t^{RANS} + \overline{\hat{u}'\hat{v}'} \Big/ \frac{d\overline{\hat{u}}}{dy}, \qquad (1)$$

as illustrated in FIG. 1.

In equation (1) the term $$\overline{\hat{u}'\hat{v}'}$$

is the resolved Reynolds shear stress, $\hat{u}'$ and $\hat{v}'$ are the instantaneous streamwise and wall-normal velocity fluctuations, defined as $$\hat{u}' = \hat{u} - \overline{\hat{u}}$$

and $$\hat{v}' = \hat{v} - \overline{\hat{v}},$$

respectively.

$$\frac{d\overline{\hat{u}}}{dy}$$

is the wall-normal derivative of the average streamwise velocity, $$\overline{\hat{u}},$$

and $V_t^{RANS}$ is the RANS eddy-viscosity. The averaging operator $\overline{()}$ is either time-averaging in general three-dimensional flows or plane-averaging in two-dimensional flows and spanwise-averaging in flows with one homogeneous direction.

The near-wall region is defined so that it comprises of all computational cells which are at a distance to the solid surface smaller than $y^{NW}$ (for example, for an airfoil $y^{NW}$ is typically less than 20 percent of the airfoil cord).

RANS eddy-viscosity is computed either from a look-up table or from a simultaneous solution of a RANS turbulence model.

Figure 2:
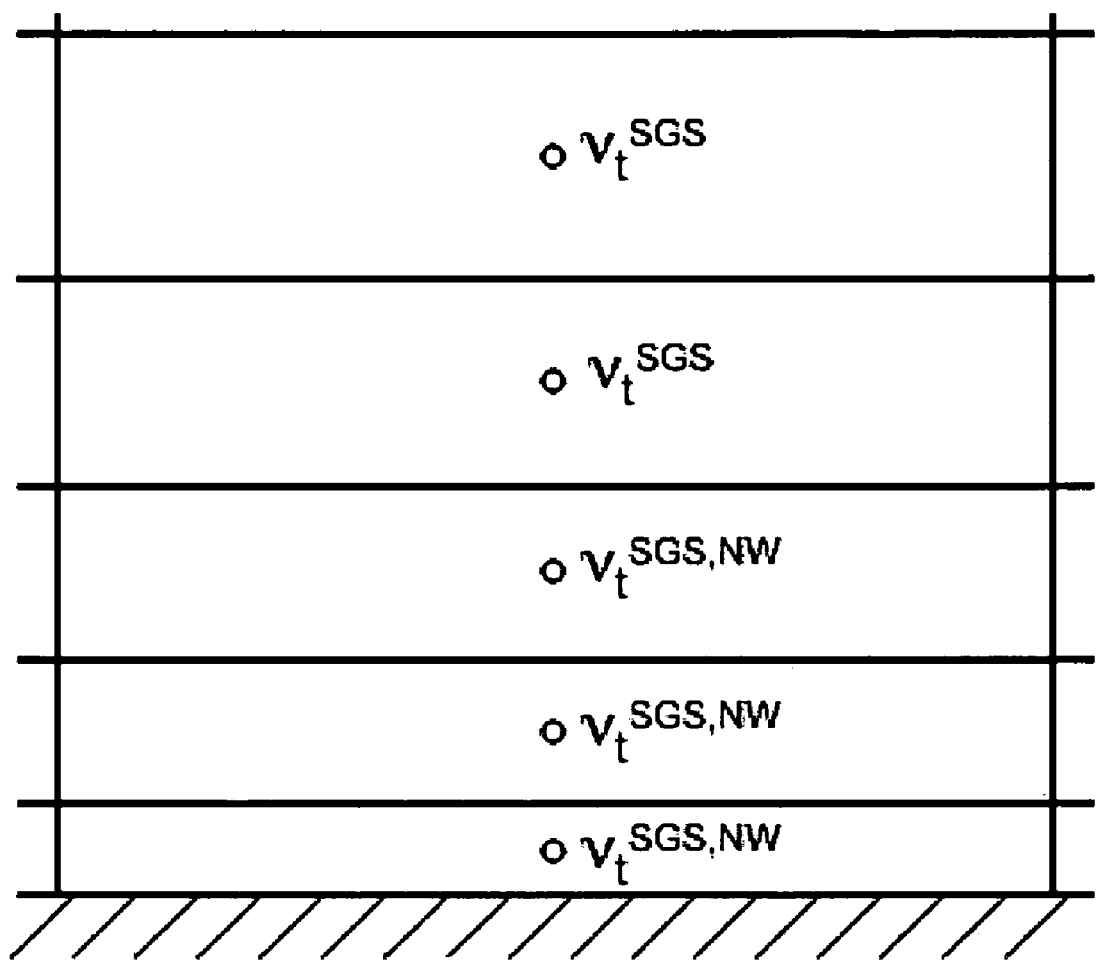
FIG. 2 shows the details of the application of the near-wall eddy-viscosity in the context of wall-parallel coarsening.
Figure 3:
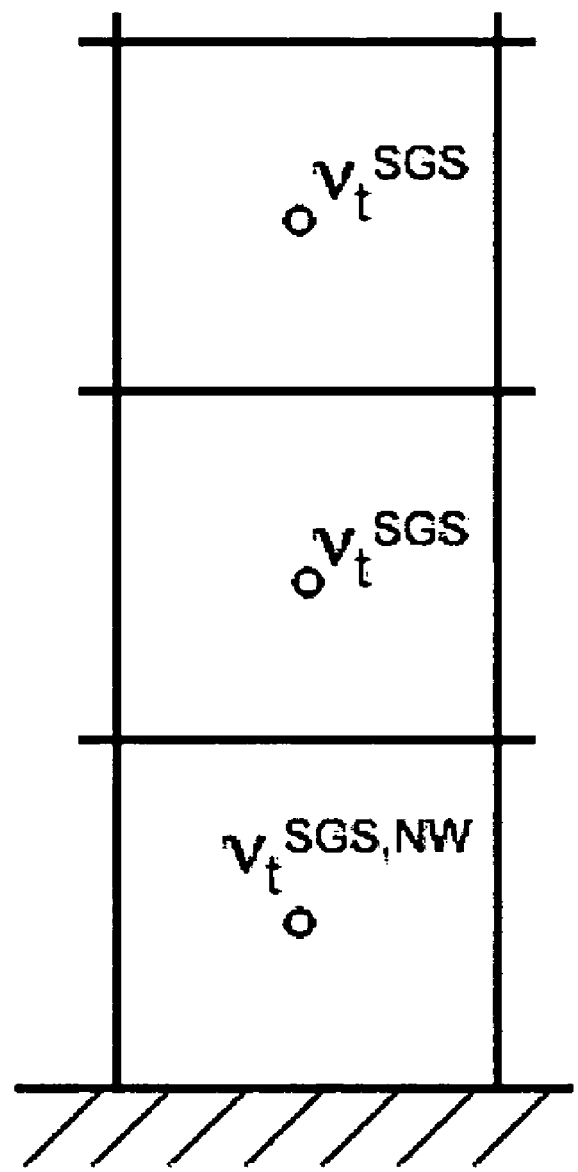
FIG. 3 shows the details of the application of the near-wall eddy-viscosity in the context of wall modeling.

Operation—Preferred Embodiment—FIGS. 2 and 3

The near-wall eddy-viscosity formulation is applied either with a wall stress model on coarse grids that do not resolve the wall or with wall-resolved grids coarsened in the wall-parallel directions.

The application of the near-wall formulation with the wall-parallel coarsening is shown in FIG. 2. With wall-parallel coarsening, the values of the non-dimensional distance to the nearest wall, $y^+ = u_\tau y/v$ (where $u_\tau$ is the friction velocity), are usually lower than 1 for the wall-adjacent cells (the wall-adjacent cells are defined here as the cells that have a common side with a wall). The no-slip boundary condition is applied for the velocity, $\hat{u}_W = 0$. The near-wall eddy-viscosity, $v_t^{SGS,NW}$, is applied in the near-wall region that typically covers up to 15 computational cells in the wall-normal direction. The sub-grid scale eddy-viscosity, $v_t^{SGS}$, is applied elsewhere. The computational savings are achieved by coarsening the grid in the wall-parallel directions (It is possible to use grids with the non-dimensional spacing in the streamwise, $\Delta x^+ = \Delta x u_\tau / v$, and spanwise directions, $\Delta z^+ = \Delta z u_\tau / v$, of approximately 50 to 100).

The application of the near-wall formulation with a wall stress model on coarse grids is illustrated in FIG. 3. The wall stress model replaces the no-slip boundary condition, $\hat{u}_W = 0$, used with the wall-parallel coarsening, with a boundary condition on the wall stress, $\tau_w$. The corresponding $y^+$ values for the wall-adjacent cells are usually in the so-called logarithmic region of the boundary layer, i.e. $y^+ > 30$, thus making the computational grids significantly coarser and more uniform. When the near-wall eddy-viscosity, $v_i^{SGS,NW}$, is used with a wall stress model, it is only applied in the wall-adjacent cells.

Description—Alternative Embodiments

The proposed near-wall eddy-viscosity formulation can be also be computed using the resolved Reynolds stress tensor, $$\overline{\hat{u}'_i \hat{u}'_j},$$

in the least square sense:

$$v_t^{SGS,NW} = v_t^{RANS} + \sum_i \sum_j \overline{\hat{u}'_i \hat{u}'_j} \hat{S}_{ij} \Big/ \left(2|\hat{S}|^2\right) \qquad (2)$$

where $\hat{u}_i'$ are the velocity fluctuations, $$\hat{\overline{S}}_{ij} = \frac{1}{2}\left(\frac{\partial \hat{\overline{u}}_i}{\partial x_j} + \frac{\partial \hat{\overline{u}}_j}{\partial x_i}\right)$$

is the strain rate tensor computed for the average velocity, $$\hat{\overline{u}}_i, \text{ and } |\hat{\overline{S}}|^2 = \sum_i \sum_j \hat{\overline{S}}_{ij} \hat{\overline{S}}_{ij}.$$

Another variation of the method is to use an approximation for the instantaneous sub-grid scale stress in the near-wall region directly:

$$\left(v_t^{SGS} \frac{d\hat{\overline{u}}}{dy}\right)_{NW} = \left(v_t^{RANS} \frac{d\overline{u}}{dy}\right) + \overline{\hat{u}'\hat{v}'} \quad (3)$$

Description—Additional Embodiments

Figure 4:
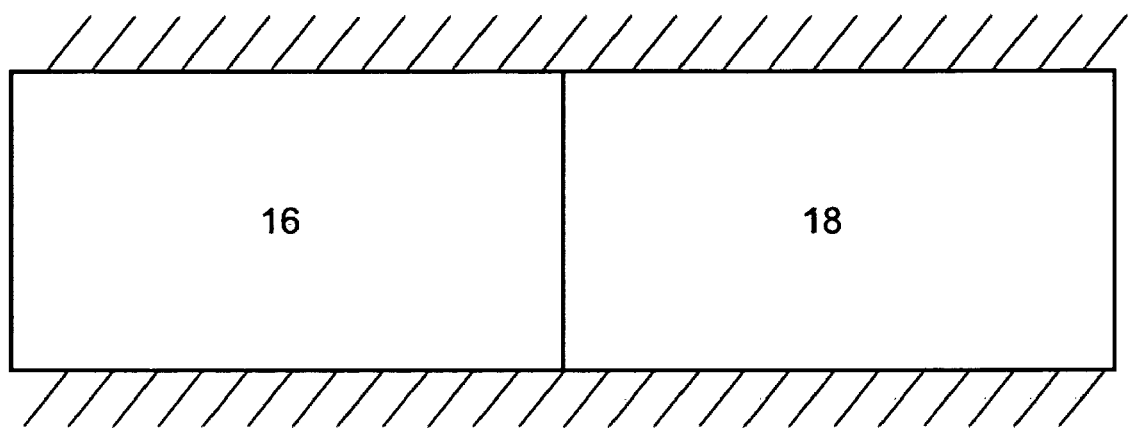
FIG. 4 shows the conceptual application of eddy-viscosity formulation to LES/RANS coupling in an internal flow.

The eddy-viscosity formulation can also be used for LES/RANS coupling in internal flows, such as presented in FIG. 4, to provide the inflow turbulence data for the RANS computational region:

$$v_t^{RANS} = \overline{v_t^{SGS}} - \sum_i \sum_j \overline{\hat{u}_i'\hat{u}_j'}\hat{\overline{S}}_{ij} \Big/ \left(2|\hat{\overline{S}}|^2\right) \quad (4)$$

where $\hat{u}_i'$ are the velocity fluctuations, $$\hat{\overline{S}}_{ij} = \frac{1}{2}\left(\frac{\partial \hat{\overline{u}}_i}{\partial x_j} + \frac{\partial \hat{\overline{u}}_j}{\partial x_i}\right)$$

is the strain rate tensor computed for the average velocity, $$\hat{\overline{u}}_i, \text{ and } |\hat{\overline{S}}|^2 = \sum_i \sum_j \hat{\overline{S}}_{ij}\hat{\overline{S}}_{ij}, \overline{v_t^{SGS}}$$

is the average sub-grid scale eddy-viscosity. The RANS eddy-viscosity, $v_t^{RANS}$, is then used to compute turbulence variables, for example, in k-ω model it is used to compute ω if k is computed as $$k = \frac{1}{2}\sum_i \overline{\hat{u}_i'\hat{u}_i'}.$$

CONCLUSIONS, RAMIFICATIONS, AND SCOPE

From the description above, a number of advantages of our invention become evident. Our invention makes it possible to perform accurate large-eddy simulation of high Reynolds flows with the currently existing computer hardware. Compared to other near-wall formulations, it has the advantage of being consistent with wall-resolved large-eddy simulation, that it is simple, easy to implement and that it adds negligible extra computational cost. The near-wall eddy-viscosity has been successfully tested flows at high Reynolds numbers, as presented in Kalitzin, G., Templeton, J. A., and Medic, G. (2006), "A near-wall eddy-viscosity formulation for LES", Lecture Notes in Computational Science and Engineering Vol. 56, Springer-Verlag: the computed results are superior to results from the large-eddy simulations that do not use our near-wall eddy-viscosity.

Accordingly, the reader will see that the near-wall eddy-viscosity formulation of this invention can significantly reduce the computational cost of predicting high Reynolds number turbulent flows around wings, blades and bluff bodies (such as cars) by improving the accuracy of the LES on coarse near-wall grids. In addition, several advantages of the present invention are in that:

it provides a model that automatically adapts to the computational grid that is used in the simulation;

it provides a model that automatically adapts to flow Reynolds number;

it provides a model that, compared to other near-wall formulations for LES, has the advantage of being consistent with full-blown wall-resolved LES;

it provides a model that is simple and easy to implement in a variety of computational codes; and it provides a model that adds negligible extra computational cost to performing LES.

Although the description above contains many specificities, these should not be construed as limiting the scope of the invention but as merely providing illustrations of some of the presently preferred formulations of this invention. For example, the eddy-viscosity formulation can be used as an ingredient in coupling general RANS and LES computational codes beyond the near-wall region.

Thus, the scope of this invention should be determined by the appended claims and their legal equivalents, rather than the examples given.

We claim:

1. A method to compute turbulent flow, comprising of the following steps: reading object geometry for providing points on a surface of an object; establishing a computational mesh around said object; marking the computational cells in a region near the surface of said object; calculating turbulent flow field data in the entire computational mesh by solving the filtered Navier-Stokes equations using large-eddy simulation; substituting the sub-grid scale eddy-viscosity in said region near the surface of said object with a near-wall eddy-viscosity; said near-wall eddy-viscosity comprises of the sum of a Reynolds Averaged Navier-Stokes eddy-viscosity and the ratio of the product of the average of the resolved Reynolds shear stress tensor with the average strain rate tensor over the square of the average strain rate tensor multiplied by two.

2. The method of claim 1, wherein said step of computing the Reynolds Averaged Navier-Stokes eddy-viscosity comprises of tabulated data of eddy-viscosity pre-computed for attached zero pressure gradient boundary layers.

3. The method of claim 1, wherein said step of computing the Reynolds Averaged Navier Stokes eddy-viscosity comprises of data of eddy-viscosity from a simultaneous solution of a Reynolds Averaged Navier Stokes turbulence model.

4. The method of claim 1, wherein said average is computed with one of the following: spanwise average, span- and streamwise average, time average, and ensemble average.

5. The method of claim 1, wherein said near-wall eddy-viscosity comprises of the sum of a Reynolds Averaged Navier-Stokes eddy-viscosity and the ratio of an average of the resolved Reynolds shear stress over the wall normal derivative of the averaged velocity.

6. The method of claim 1, wherein said computational mesh is coarsened only in wall-parallel directions near the wall and the cells adjacent to the wall are located in the viscous sub-layer.

7. The method of claim 6, wherein at said wall the velocity is set to zero.

8. The method of claim 1, wherein said computational mesh is coarsened in wall-parallel and wall normal directions near the wall.

9. The method of claim 8, wherein at said wall the stress is prescribed.

10. The method of claim 9, wherein said stress at the wall comprises of tabulated data of stress pre-computed for attached zero pressure gradient boundary layers.

11. The method of claim 9, wherein said stress at the wall comprises of data of stress from a simultaneous Reynolds Averaged Navier-Stokes simulation on a Reynolds Averaged Navier-Stokes grid.

12. A method to compute turbulent flow, comprising of the following steps: reading object geometry for providing points on a surface of an object: establishing a computational mesh around said object; dividing said computational mesh in two distinct adjacent regions; calculating turbulent flow field data in one of said regions by solving the filtered Navier-Stokes equations using large-eddy simulation; calculating turbulent flow field data in the other of said regions by solving the Reynolds Averaged Navier-Stokes equations; in the boundary conditions on the large-eddy simulation side of the interface between said regions the sub-grid scale eddy-viscosity comprises of the sum of the Reynolds Averaged Navier-Stokes eddy-viscosity and the ratio of the product of the average of the resolved Reynolds shear stress tensor with the average swain rate tensor over the square of the average strain rate tensor multiplied by two; in the boundary conditions on the Reynolds Averaged Navier-Stokes side of the interface between said regions the Reynolds Averaged Navier-Stokes eddy-viscosity comprises of the difference between the sub-grid scale viscosity and the ratio of the product of the average of the resolved Reynolds shear stress tensor with the average strain rate tensor over the square of the average strain rate tensor multiplied by two.

13. The turbulent flow computation method according to claims 1 or 12, wherein based on a result of said computation, a stream line, a trajectory, a particle trace or volume rendering is visualized or a drag coefficient, a lift coefficient, and a moment coefficient are computed.

* * * * *